US006530617B2

(12) United States Patent
McElwee et al.

(10) Patent No.: US 6,530,617 B2
(45) Date of Patent: Mar. 11, 2003

(54) FRAME WITH CANVAS COVER FOR ALL-TERRAIN VEHICLE

(76) Inventors: William E. McElwee, P.O. Box 14, Lincoln St., Robertsdale, PA (US) 16674; Shari A. McElwee, P.O. Box 14, Robertsdale, PA (US) 16674

( * ) Notice: Subject to any disclaimer, the term of this patent is extended or adjusted under 35 U.S.C. 154(b) by 0 days.

(21) Appl. No.: 09/853,611

(22) Filed: May 14, 2001

(65) Prior Publication Data

US 2002/0167190 A1 Nov. 14, 2002

(51) Int. Cl.⁷ .................................................. B60J 1/00
(52) U.S. Cl. ........................ 296/77.1; 296/136; 280/770
(58) Field of Search ............... 296/77.1, 136; 280/770

(56) References Cited

U.S. PATENT DOCUMENTS

| | | | | |
|---|---|---|---|---|
| 727,844 A | * | 5/1903 | Russell | 191/17 |
| 1,377,910 A | * | 5/1921 | Munson | 296/77.1 |
| 2,423,748 A | * | 7/1947 | Acheson | 296/77.1 |
| 4,773,694 A | | 9/1988 | Gerber | |
| 4,795,205 A | * | 1/1989 | Gerber | 296/77.1 |
| 4,950,017 A | | 8/1990 | Norton | |
| 5,174,622 A | | 12/1992 | Gutta | |
| 5,203,601 A | | 4/1993 | Guillot | |
| 5,217,275 A | * | 6/1993 | Ridge | 296/77.1 |
| D355,403 S | | 2/1995 | Eberle | |
| 5,458,390 A | | 10/1995 | Gilbert | |
| 5,509,717 A | | 4/1996 | Martin | |
| 5,961,175 A | | 10/1999 | Clardy, Jr. | |
| 6,158,801 A | * | 12/2000 | Tucker | 296/146.1 |
| 6,402,220 B2 | * | 6/2002 | Allen | 296/77.1 |
| 6,416,108 B1 | * | 7/2002 | Elswick | 296/77.1 |
| 2002/0089207 A1 | * | 7/2002 | Bayerle et al. | 296/77.1 |

FOREIGN PATENT DOCUMENTS

| | | |
|---|---|---|
| DE | 2 031 651 | 6/1972 |
| DE | 44 04 415 | 8/1995 |

* cited by examiner

Primary Examiner—D. Glenn Dayoan
Assistant Examiner—Hilary Gutman
(74) Attorney, Agent, or Firm—Richard C. Litman

(57) ABSTRACT

A kit removably attaches and stores a frame with a canvas cover for an all-terrain vehicle. The frame comprises preformed metal tubing sections for the front, sides, doors, and rear portions which are welded together. The integrated canvas cover is attached to the frame by snaps. The cover has plastic windows for all sides with a flexible rear window which can be rolled up. The cover and frame are stable even while driving at 60 mph.

7 Claims, 4 Drawing Sheets

FRAME WITH CANVAS COVER FOR ALL-TERRAIN VEHICLE

BACKGROUND OF THE INVENTION

1. Field of the Invention

The present invention relates generally to covers for uncovered all-terrain vehicles (ATV). More specifically, the invention is a lightweight tubular metal frame attachable to an ATV. The fabric cover with plastic windows is quickly attached by snaps to the frame.

2. Description of the Related Art

The related art of interest describes various framed covers for various vehicles, but none discloses the present invention. There is a need for a cover with a supporting frame for coverless all-terrain vehicles (ATV). The related art will be discussed in the order of perceived relevance to the present invention.

U.S. Pat. No. 5,174,622 issued on Dec. 29, 1992, to Paul J. Gutta describes a combination roll cage and cover for all-terrain vehicles comprising the attachment of the cover to the frame by screws or heavy duty fasteners. The heavy duty frame consists of a lower frame portion on each side to fit between the fenders, three bows connected by two stabilizer rods and a rear screen and rack. The fabric cover has a front mounted window, but lacks windows on all other sides and doors. The roll cage and cover combination is distinguishable for requiring a lower frame portion between the fenders and lacking windows in the cover for the sides, rear and doors.

U.S. Pat. No. 5,203,601 issued on Apr. 20, 1993, to Wilmer E. Guillot describes a rigid vinyl frame including a floorboard and a flexible removable cover having headlight, radiator and taillight openings for three- or four-wheeled hunting and recreational vehicles. The cover is attached by snaps. Hinged doors are provided having pivoting upward, transparent side window panels. The frame and cover combination is distinguishable for requiring an integrated solid plastic frame structure with a floorboard, top cover, front cover, and sides.

U.S. Pat. No. 5,509,717 issued on Apr. 23, 1996, to Robert L. Martin describes a removable all-terrain vehicle enclosure having a rigid frame and a rigid skin secured to form a door and windows. The enclosure is distinguishable for requiring a rigid skin covering.

U.S. Pat. No. 4,773,694 issued on Sept. 27, 1988, to Curtis E. Gerber describes a removable golf cart enclosure comprising a roof panel and front, rear and side panels provided with zippers to enable the rolling up of each suspended panel and tucked under the roof panel. The enclosure is distinguishable for requiring the roof panel to have a structure to enable the tucking in of each rolled side panel.

U.S. Pat. No. 4,950,017 issued on Aug. 21, 1990, to Don S. Norton describes a kit which provides a removable top assembly for all-terrain vehicles comprising a pair of lateral upright supports fixed to the rear of the vehicle. Forward and rearward U-shaped upright support bows are removably coupled to the lateral supports. A horizontal support bow is removably coupled to an upper region of the forward upright support bow. A fabric top component is added on top. The cover kit is distinguishable for lacking side and rear panels.

U.S. Pat. No. 5,961,175 issued on Oct. 5, 1999, to John L. Clardy, Jr. describes a vehicle canopy comprising a solid planar top frame coupled with front and rear frames. The front frame has an upper window pane and a lower window pane which pivots up. The rear frame has a window pane. Two pairs of flexible side windows are provided with each side window attachable by hook and loop fastening. The canopy is distinguishable for its required solid top and non-collapsible frame.

U.S. Pat. No. 5,458,390 issued on Oct. 17, 1995, to Randy B. Gilbert describes a retrofittable, removable soft top enclosure assembly kit for a motorcycle for use at and below highway speeds. The assembly includes first and second pairs of detachable upright supports coupled to the forward and rearward guards of the motorcycle. A fabric cover is removably affixed to the rectangular frame. The assembly kit is distinguishable for its limitation to motorcycles.

U.S. Pat. No. Des. 355,403 issued on Feb. 14, 1995, to Ronald D. Eberle describes an ornamental cab for an all-terrain vehicle comprising as best understood a planar top integrated with a convex front surface and a planar rear surface. The sides are planar with apparently doors included. The cab is distinguishable for being an integrated single unit structure.

German Patent Application No. 2 031 651 published on Jun. 15, 1972, for Siegfried Steiner et al. describes an integrated cover for a vehicle pivotable on a platform. The cover is distinguishable for its required cover and platform.

German Patent Application No. 44 04 415 A1 published on Aug. 17, 1995, for Victor Richtsfeld describes an operator's cab for a construction vehicle such as an excavator comprising a frame member, a two-section front window wherein the upper window can be stowed upward under the cab roof. The cab is distinguishable for its required window construction.

None of the above inventions and patents, taken either singularly or in combination, is seen to describe the instant invention as claimed. Thus, a framed canvas cover which is readily dismantled and stored with the frame for an ATV solving the aforementioned problems is desired.

SUMMARY OF THE INVENTION

The present invention is directed to a kit for attaching a removable and dismantleable cover and frame on an all-terrain vehicle. The canvas cover with plastic windows on a tubular metal frame can be removed and stored. The frame comprises preformed metal tubing sections for the front, sides, doors, and rear portions which are welded together. The canvas cover has plastic windows for all sides except the windshield which can be rolled up. The cover and frame are stable even while driving at 60 mph.

Accordingly, it is a principal object of the invention to provide a kit for assembling a frame with a cover, door and windows.

It is another object of the invention to provide a kit to cover an all-terrain vehicle.

It is a further object of the invention to provide a canvas cover which can be detached and stored.

Still another object of the invention is to provide a portable frame and cover for an all-terrain vehicle which can withstand speeds up to 60 mph.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
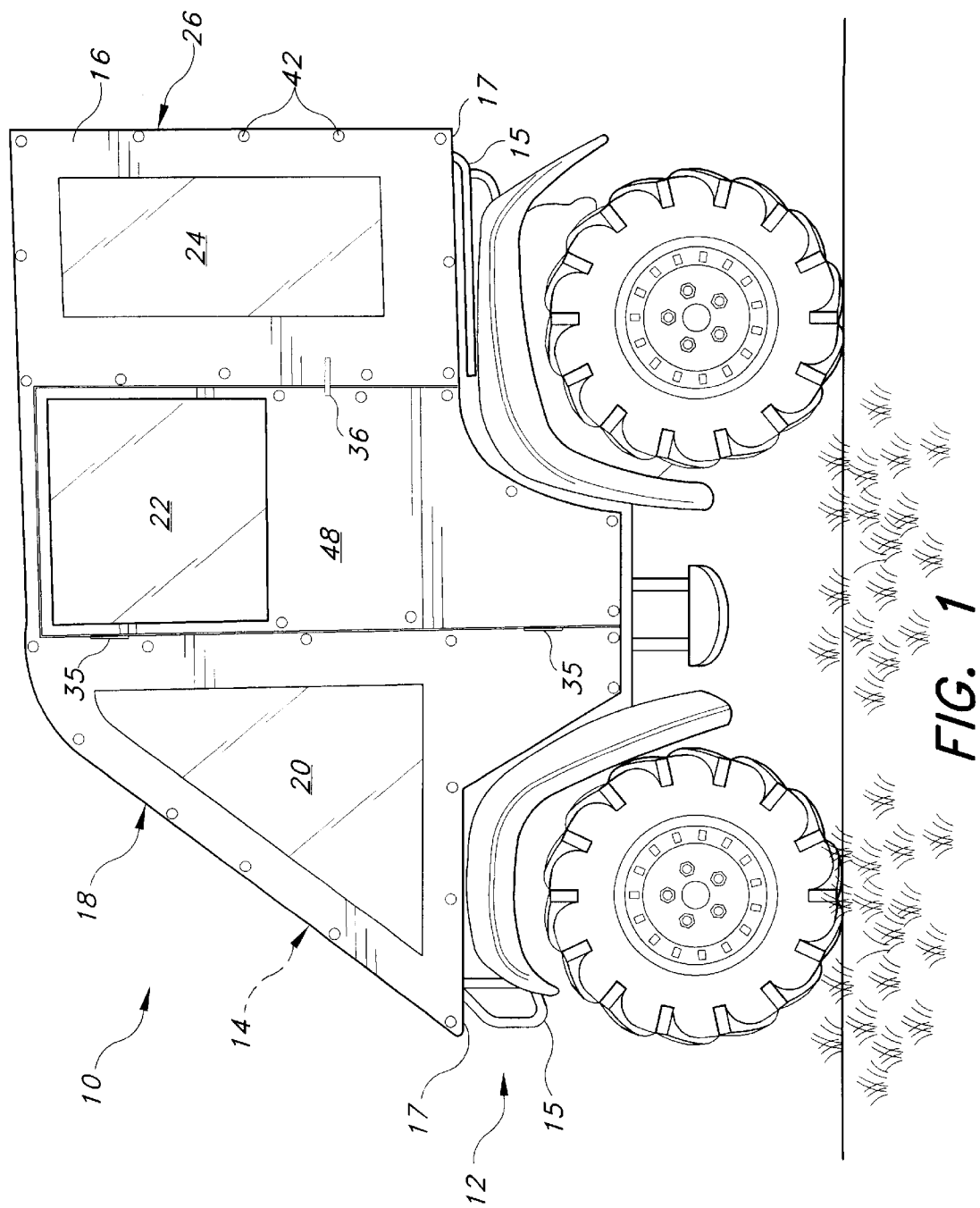
FIG. 1 is an environmental, elevational left side view of a frame with canvas cover on an all-terrain vehicle according to the present invention.

The present invention is illustrated in FIG. 1 as an assembled kit 10 attached to an all-terrain vehicle (ATV) 12. The kit 10 provides a frame 14 (hidden) covered by a canvas top cover 16 containing a rigid plastic windshield 18 (hidden), a triangular flexible plastic front side window 20, a rectangular flexible plastic door window 22, a rectangular flexible plastic rear side window 24, and a rectangular flexible plastic rear window 26 (hidden). The windows 20, 22 and 24 are duplicated for the opposite side of the canvas top cover 16 and are sewn into the canvas top cover 16.

Figure 2:
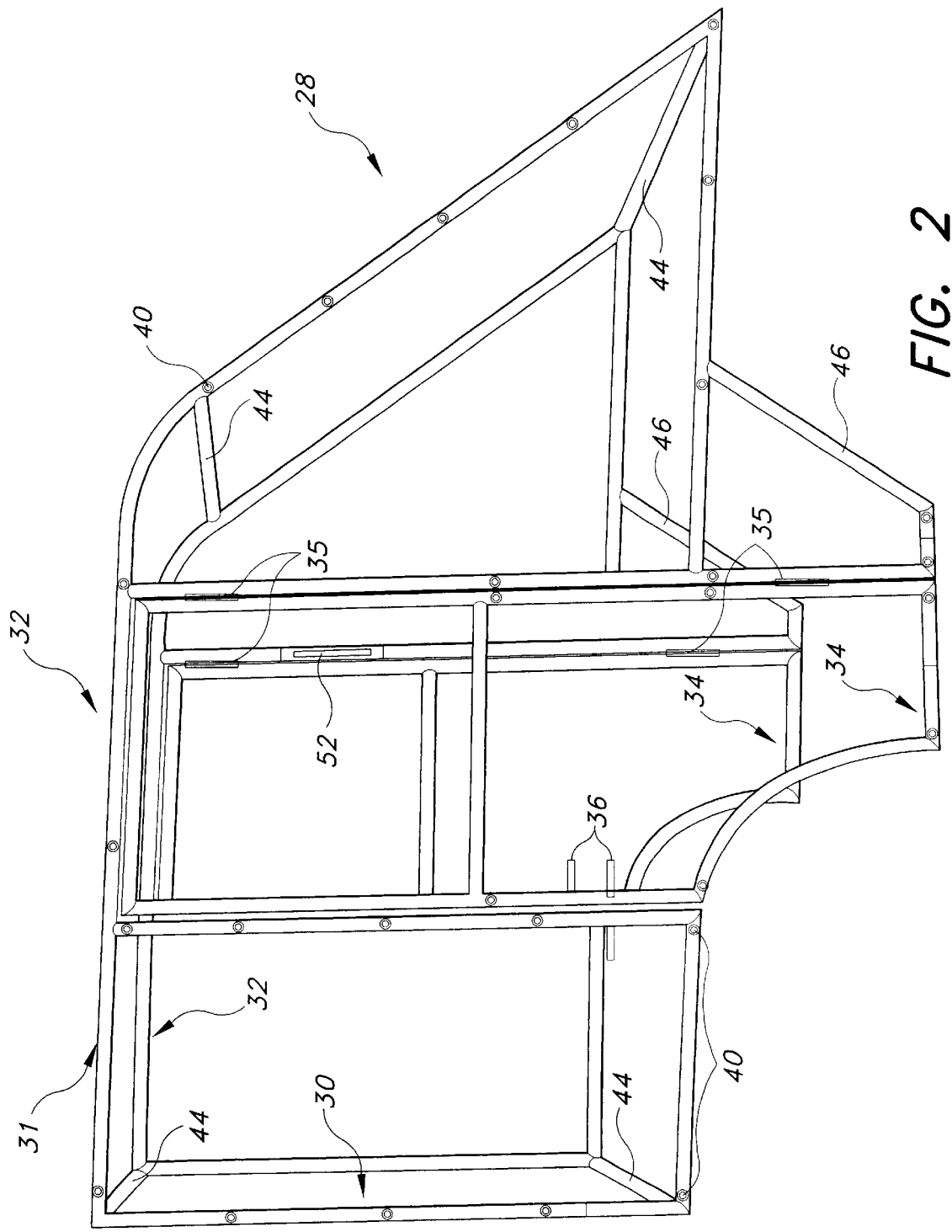
FIG. 2 is a right side elevational view of the frame structure.
Figure 3:
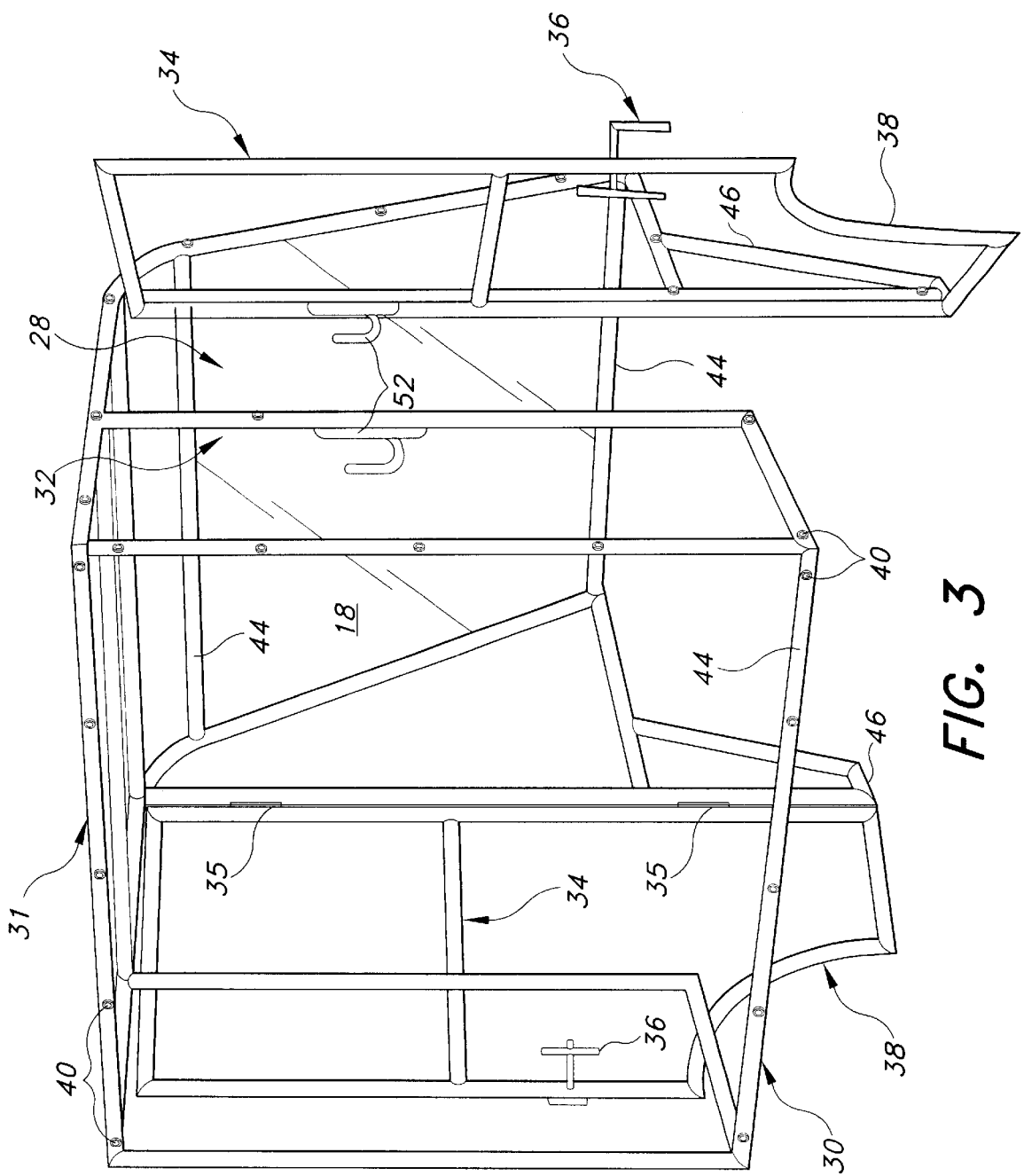
FIG. 3 is a rear perspective view of the frame structure with the front windshield in place.
Figure 4:
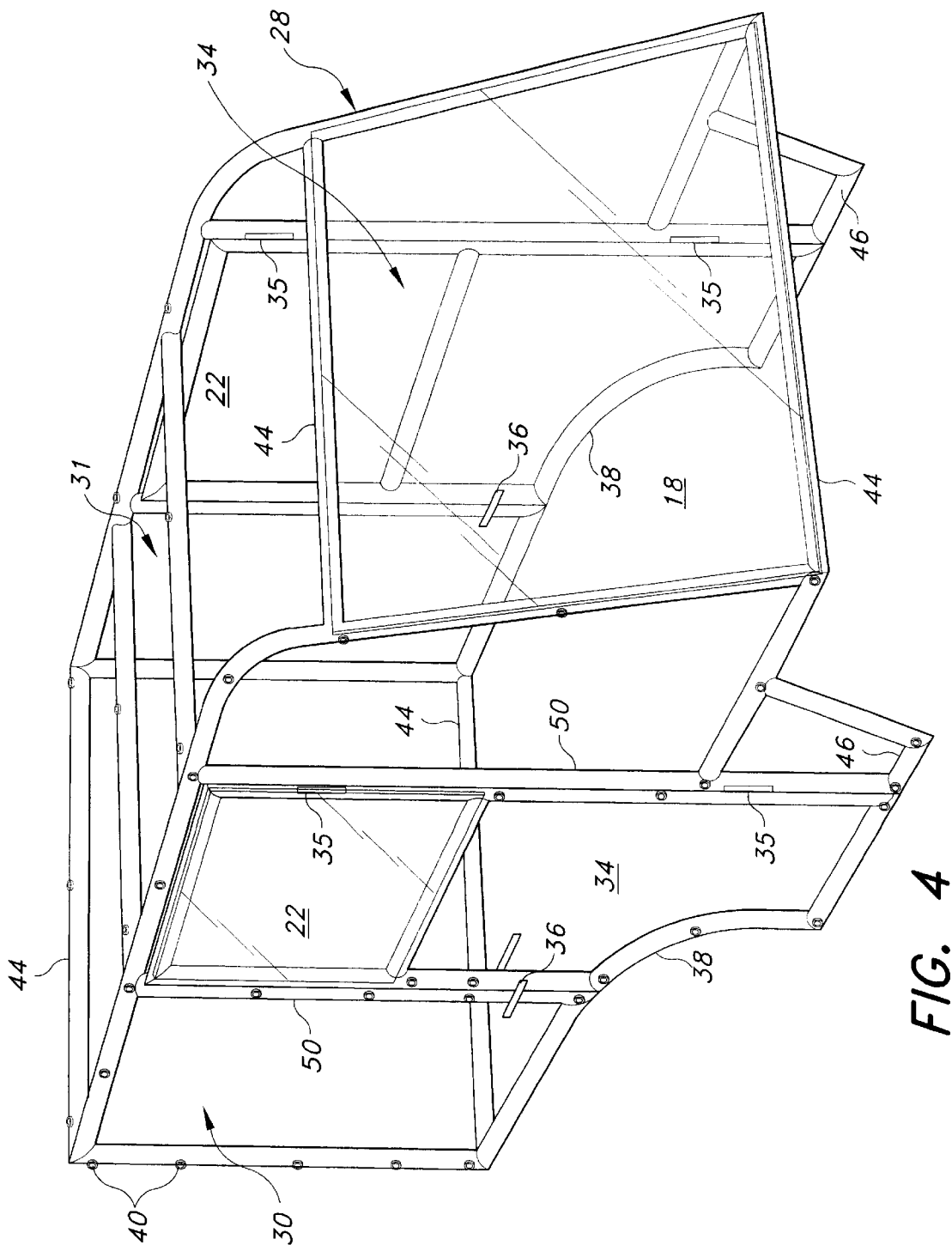
FIG. 4 is a right side perspective schematic view of the frame structure showing the locking connectors for each segment.

In the various views of the frame 14 depicted in FIGS. 2, 3 and 4, the frame 14 consists of preformed electrometallic tubing parts consisting of 20 gauge tin tubes, ¾ inch diameter, and galvanized with a zinc coating. Other materials could be used, e.g., suitable gauge stainless steel. All the tubing parts are removably fastened together at their corners, and the curved sections do not have wrinkles. Frame 14 consists of welded sections to form a windshield section 28, a rear section 30, a top section 31, and two side sections 32 which include pivotable and lockable doors 34 with U-shaped door handles 36 which pivot to clamp on the jamb 50. The side section 32 on the passenger side has hooked gun rack supports 52 on each jamb 50. The doors 34 have curvilinear bottom portions 38 to conform to the fender structure of the vehicle 12. Female snap receiving units 40 are strategically placed throughout the exterior surface of the frame 14 for receiving the male snap units 42 on the inside surface of the cover 16, but visible in FIG. 1. The lower portions of the doors 34 have a separate cover 48.

The frame 14 has crossbars 44 which join the two sides of the frame. Two crossbars 44 support the front planar windshield 18 which is made of either inflexible LEXAN (TM) which is preferred or PLEXIGLAS (TM) (polymethylmethacrylate plastic) by suitable removable fasteners. An L-shaped strut 46 supports the door frame and the lower edge of the windshield section 28. The front side windows 20, the door windows 22, the rear side windows 24, and the rear window 26 are all made of flexible and foldable VICAR (TM) which is a polyvinylchloride plastic sheeting having a thickness of 20 gauge or 1/16 inch thickness. The rear window 26 can be conveniently rolled up for travelling or for storage by cords (not shown) on the top portion of the frame 14. Each of the doors 34 have a pair of conventional hinges 35 opposite the handle 36. The frame 14 is removably fastened to the vehicle 12 between the front and rear racks 15 by fasteners 17 such as plastic zip ties (FIG. 1).

Thus, a portable and disassembleable kit 10 has been shown which can be readily attached to an all-terrain vehicle and capable of withstanding speeds of 60 mph.

It is to be understood that the present invention is not limited to the embodiments described above, but encompasses any and all embodiments within the scope of the following claims.

We claim:

1. A kit for covering an all-terrain vehicle, said kit comprising:

a tubular metal frame structure having a top section, a curvilinear windshield section, two side sections with door frames, and a rectangular rear section;

a canvas cover defining a front opening, side openings and a rear opening, said canvas cover being commensurate in area to cover the top section and the side sections of the frame structure; and a rigid transparent windshield covering the front opening, flexible transparent side windows covering the side openings, and a flexible rear window covering the rear opening of said canvas cover.

2. The kit according to claim 1, wherein the door frames have a pair of door hinges.

3. The kit according to claim 1, wherein the door frames have locking door handles.

4. The kit according to claim 1, further comprising a plurality of snaps, and wherein the canvas cover is attached to the metal frame structure by said plurality of snaps.

5. The kit according to claim 1, wherein the door frames each includes a top portion covered by one of the flexible transparent side windows and a remaining canvas portion.

6. The kit according to claim 1, wherein a flexible triangular front side window is present on each side of the vehicle.

7. The kit according to claim 1, wherein a flexible rectangular side window is present on each side adjacent the rear side of the vehicle.

* * * * *